US007066144B2

(12) United States Patent
Harunari et al.

(10) Patent No.: US 7,066,144 B2
(45) Date of Patent: Jun. 27, 2006

(54) CONTROL DEVICE AND METHOD FOR INTERNAL COMBUSTION ENGINE

(75) Inventors: Toshiaki Harunari, Yashio (JP); Koichiro Yomogida, Fujisawa (JP); Futoshi Nakano, Fujisawa (JP); Nobutaka Ishii, Fujisawa (JP); Kazuya Tomikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/903,327

(22) Filed: Jul. 30, 2004

(65) Prior Publication Data

US 2005/0028785 A1    Feb. 10, 2005

(30) Foreign Application Priority Data

Aug. 4, 2003   (JP)   ............................. 2003-205706

(51) Int. Cl.
  *F02D 9/00*   (2006.01)
(52) U.S. Cl. .................. 123/399; 123/690; 123/568.21
(58) Field of Classification Search ................ 123/396, 123/399, 690, 568.21, 568.14
  See application file for complete search history.

(56) References Cited

U.S. PATENT DOCUMENTS

| | | | | |
|---|---|---|---|---|
| 6,039,025 A | * | 3/2000 | Iwano et al. ................. | 123/399 |
| 6,079,387 A | * | 6/2000 | Mamiya et al. ............. | 123/399 |
| 6,167,342 A | | 12/2000 | Itoyama ...................... | 701/104 |
| 6,367,462 B1 | * | 4/2002 | McKay et al. ......... | 123/568.21 |
| 6,725,832 B1 | * | 4/2004 | Yokoyama et al. ......... | 123/396 |
| 2003/0186727 A1 | * | 10/2003 | van Nieuwstadt ...... | 123/568.16 |

FOREIGN PATENT DOCUMENTS

| | | |
|---|---|---|
| EP | 08086248 | 4/1996 |
| EP | 0 892 164 A2 | 1/1999 |
| EP | 0 893 590 A2 | 1/1999 |
| EP | 1 239 142 A2 | 9/2002 |
| JP | 58-035241 | 3/1983 |
| JP | 08-004601 | 1/1996 |
| JP | 09-310633 | 12/1997 |
| JP | 09-324673 | 12/1997 |
| JP | 2000-179362 | 6/2000 |
| JP | 2000-179409 | 6/2000 |

OTHER PUBLICATIONS

Copy of European Search Report for Serial No. EP 04 01 8396 dated Mar. 9, 2006.

* cited by examiner

*Primary Examiner*—Erick Solis
(74) *Attorney, Agent, or Firm*—McCormick, Paulding & Huber LLP

(57) ABSTRACT

A control device for an internal combustion engine comprising an EGR passage (22) for connecting an intake passage (17) and an exhaust passage (18) with each other, an EGR valve (24) provided in the EGR passage (22), and an intake throttle valve (19) provided in the intake passage (17) at an upstream side of the connection part with the EGR passage (22). The control device comprises operational state detection means for detecting an operational state of the internal combustion engine, first control means for controlling opening and closing of the intake throttle valve (19) and the EGR valve (24) to adjust intake air volume if the operational state detection means detects a normal operational state, and second control means for controlling the intake throttle valve (19) at a predetermined constant opening degree and for controlling opening and closing of the EGR valve (24) to adjust an intake air volume if the operational state detection means detects a predetermined operational state.

10 Claims, 3 Drawing Sheets

CONTROL DEVICE AND METHOD FOR INTERNAL COMBUSTION ENGINE

CROSS REFERENCE TO RELATED APPLICATION

Applicants hereby claim foreign priority benefits under 35 U.S.C. § 119 of Japanese Patent Application No. 2003-205706 filed Aug. 4, 2003, and the content of which is herein incorporated by reference.

BACKGROUND OF THE INVENTION

1. Field of the Invention

The present invention relates to a control device and method for an internal combustion engine comprising an EGR (Exhaust Gas Recirculation) device and an intake throttle valve, and in particular to a control device and method for the internal combustion engine for controlling an intake air volume and an EGR volume.

2. Description of the Related Art

In a diesel engine, an EGR device is generally known as a device for reducing amount of NOx (nitrogen oxide) emission. This EGR device comprises an EGR passage connecting an intake passage and an exhaust passage with each other, and an EGR valve which is provided in the EGR passage.

In the EGR device, the EGR valve is opened to allow some of the exhaust gas in the exhaust passage to flow into the intake passage through the EGR passage. The some of the exhaust gas is mixed with the intake air in the intake passage and then the mixture is led into a combustion chamber. Thereby, oxygen concentration in the intake air is decreased, combustion temperature is lowered, and amount of NOx emission is reduced.

On the other hand, it is known to provide an intake throttle valve in the intake passage of diesel engine in order to ensure a prompt engine stop and a reduction of intake noise in a specific operational state.

In recent years, a diesel engine which comprises both the EGR device and the intake throttle valve is provided. In this case, the intake throttle valve is provided in the intake passage at an upstream side of a connection part with the EGR passage.

This type of the internal combustion engine provided with the EGR device and the intake throttle valve is disclosed in Japanese Laid-Open Patent Application No. 9-310633, etc.

In the conventional diesel engine which is provided with the EGR device and the intake throttle valve, it is a normal way that the intake throttle valve is controlled to adjust intake air volume, and the EGR valve is controlled to adjust EGR volume (or EGR rate).

However, in the conventional control device in which the intake air volume and the EGR volume are separately controlled, there is a possibility that a preferable control cannot be performed because the opening degrees of the intake throttle valve and the EGR valve affect both intake air volume and EGR volume.

This is described in more detail. The opening degree of the intake throttle valve affects the EGR volume as well because it changes the negative pressure state at the downstream side of the intake throttle valve in the intake passage. Moreover, since the opening degree of the EGR valve defines the EGR gas volume which is recirculated to the intake passage, it also affects the fresh intake air volume in the intake passage at the downstream side of the connection part with the EGR passage.

That is, the opening degrees of the intake throttle valve and the EGR valve, and the intake air volume and the EGR volume are closely related to each other. Accordingly, there is a limit in the conventional control device which controls them separately.

SUMMARY OF THE INVENTION

The present invention has developed with foregoing problems in view, and it is an object of the present invention to appropriately control the intake air volume and the EGR volume.

According to a first aspect of the present invention, a control device for an internal combustion engine comprising an EGR passage for connecting an intake passage and an exhaust passage with each other, an EGR valve provided in the EGR passage, and an intake throttle valve provided in the intake passage at an upstream side of a connection part with the EGR passage, is provided, wherein the control device comprises operational state detection means for detecting an operational state of the internal combustion engine, first control means for controlling opening and closing of the intake throttle valve and the EGR valve to adjust intake air volume if the operational state detection means detects a normal operational state, and second control means for controlling the intake throttle valve at a predetermined constant opening degree and for controlling opening and closing of the EGR valve to adjust intake air volume if the operational state detection means detects a predetermined operational state.

With this constitution of the control device, it is possible to appropriately control both the intake air volume and the EGR volume.

The control device may further comprise actual intake air volume detection means for detecting an actual intake air volume at an upstream side of the intake throttle valve, and target intake air volume calculation means for calculating a target intake air volume based on an operational state detected by the operational state detection means, wherein the first control means may control the opening degrees of the intake throttle valve and the EGR valve, based on a difference between the target intake air volume and the actual intake air volume, and the second control means may control the opening degree of the intake throttle valve at a predetermined constant opening degree, and control the opening degree of the EGR valve based on the difference between the target intake air volume and the actual intake air volume.

Preferably, the predetermined operational state is an idling operational state and/or a decelerating operational state.

Preferably, the operational state detection means comprises an accelerator opening degree sensor for detecting an accelerator opening degree and/or an engine rotation speed sensor for detecting an engine rotation speed.

Preferably, the predetermined constant opening degree is such an opening degree that an intake noise does not occur.

According to a second aspect of the present invention, a control method for an internal combustion engine comprising an EGR passage for connecting an intake passage and an exhaust passage with each other, an EGR valve provided in the EGR passage, and an intake throttle valve provided in the intake passage at an upstream side of a connection part with the EGR passage, is provided, wherein the control method comprises steps of: detecting an operational state of the internal combustion engine; performing a first control for controlling opening and closing of the intake throttle valve and the EGR valve to adjust an intake air volume, if the detected operational state is a normal operational state; and performing a second control for controlling an opening degree of the intake throttle valve at a predetermined constant opening degree, and for controlling opening and closing of the EGR valve to adjust the intake air volume, if the detected operational state is a predetermined operational state.

With this constitution of the present invention, the intake air volume and the EGR volume are appropriately controlled.

The control method may further comprise steps of; detecting an actual intake air volume at the upstream side of the throttle valve in the intake passage; and calculating a target intake air volume based on the detected operational state; and the first control may comprise controlling the opening degrees of the intake throttle valve and the EGR valve, based on the difference between the target intake air volume and the actual intake air volume, and the second control may comprise controlling the opening degree of the intake throttle valve at the predetermined constant opening degree and controlling the opening degree of the EGR valve based on the difference between the target intake air volume and the actual intake air volume.

Preferably, the predetermined operational state comprises an idling operational state and/or a decelerating operational state.

Preferably, the detecting of the operational state includes a step of detecting an accelerator opening degree and/or a step of detecting an engine rotation speed.

Preferably, the predetermined constant opening degree is such an opening degree that the intake noise does not occur.

DESCRIPTION OF THE PREFERRED EMBODIMENTS

Hereinafter, preferred embodiments of the present invention will now be described with reference to the accompanying drawings.

Figure 1:
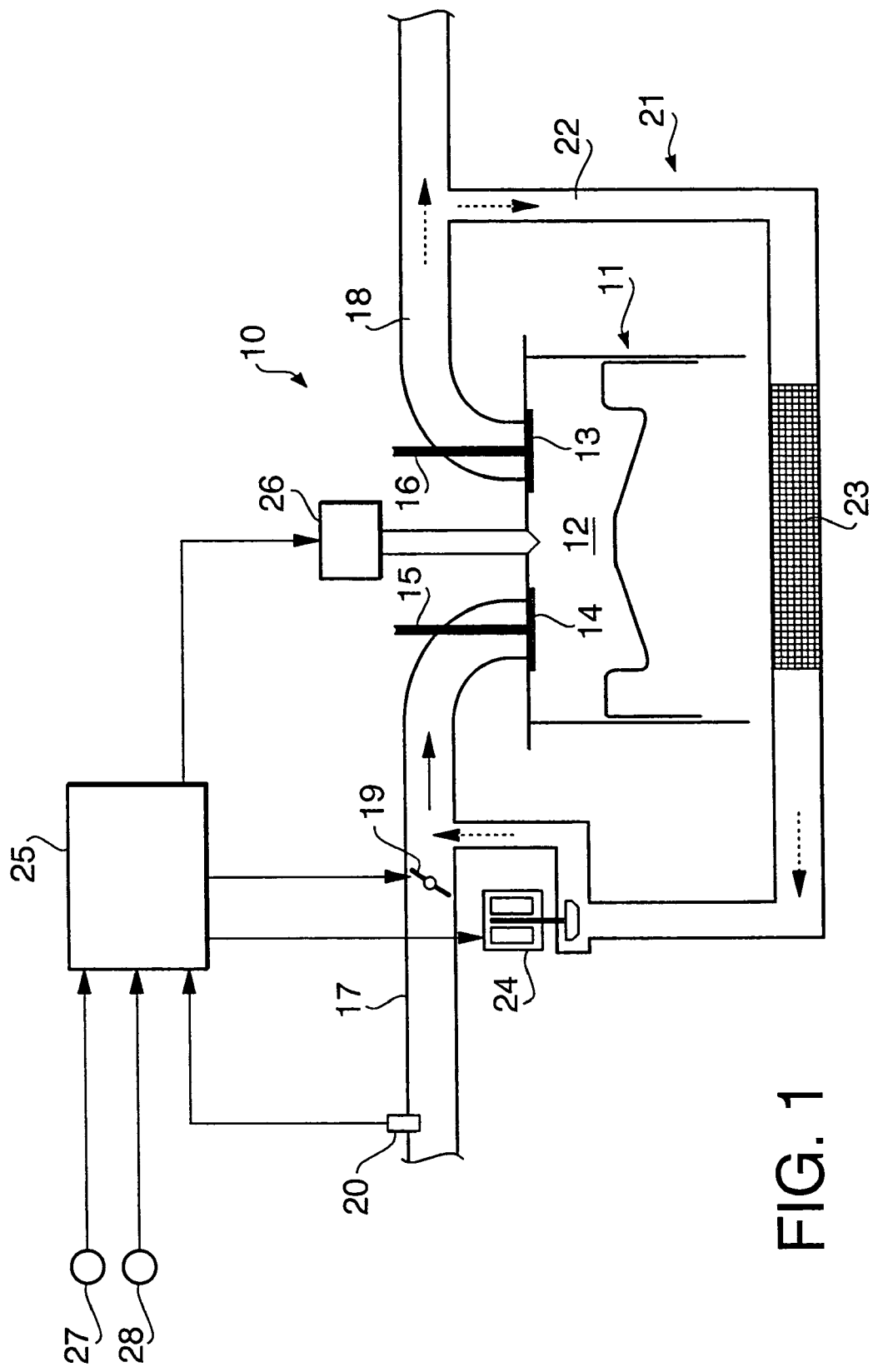
FIG. 1 is a schematic diagram illustrating a control device for an internal combustion engine according to a preferred embodiment of the present invention.

As shown in FIG. 1, an internal combustion engine (diesel engine) 10 of the present embodiment is equipped in a vehicle, and comprises a main part 11 including a combustion chamber 12 at its each cylinder. An injector 26 is provided in the combustion chamber 12, and an intake port 14 and an exhaust port 13 are provided.

The intake port 14 is connected to an intake passage 17, and is opened and closed by an intake valve 15. An exhaust port 13 is connected to an exhaust passage 18, and is opened and closed by an exhaust valve 16.

An EGR device 21 is provided between the intake passage 17 and the exhaust passage 18. The EGR device 21 comprises an EGR passage 22 connecting the intake passage 17 and the exhaust passage 18 with each other. An EGR valve 24 for adjusting the opening area of the EGR passage 22 is provided near a connection part with the intake passage 17 in the EGR passage 22. In the middle of the EGR passage 22, an EGR cooler 23 is provided to cool EGR gas. The intake throttle valve 19 is provided at an upstream side of the connection part with the EGR passage 22 in the intake passage 17.

An intake air volume sensor (actual intake air detection means) 20 which detects the actual intake air volume at the upstream side of the intake throttle valve 19 is provided at the upstream side of the intake throttle valve 19 in the intake passage 17.

Apart of exhaust gas in the exhaust passage 18 flows to the EGR passage 22, and reaches the EGR cooler 23. The exhaust gas is recirculated to the intake passage 17 after being cooled by the EGR cooler 23. The exhaust gas is mixed with fresh intake air in the intake passage 17, and then flows to the combustion chamber 12.

In the meantime, if the opening degree of the intake throttle valve 19 is kept (or fixed) at a constant value and the opening degree of the EGR valve 24 is increased, the amount of the exhaust gas (i.e. EGR volume) which is recirculated to the intake passage 17 is increased. Moreover, if the opening degree of the EGR valve is increased, the intake resistance caused by EGR gas is increased. As a result, the amount of the fresh intake air at the downstream side of the connection part with the EGR passage 22 in the intake passage 17 is decreased.

On the other hand, if the opening degree of the EGR valve 24 is kept (or fixed) at a constant value and the opening degree of the intake throttle valve 19 is increased, the amount of the fresh intake air is increased. Moreover, if the opening degree of the intake throttle valve 19 is increased, the pressure difference between the intake passage 17 and the exhaust passage 18 is decreased, and the EGR volume is decreased.

That is, the opening degrees of the intake throttle valve 19 and the EGR valve 24 affect both the fresh intake air volume and the EGR volume.

The control device of the present embodiment which controls the internal combustion engine 10 comprises an ECU (electronic control unit) 25 as an engine control device, an accelerator opening degree sensor 27 (operational state detection means) for detecting an accelerator opening degree, and an engine rotation speed sensor 28 (operational state detection means) for detecting an engine rotation speed.

The ECU 25 is connected to various sensors such as the intake air volume sensor 20, the accelerator opening degree sensor 27, and the engine rotation speed sensor 28, and these sensors respectively send signals (detected values) to the ECU 25. The ECU 25 is connected to the injector 26, the EGR valve 24 and the intake throttle valve 19, and outputs control signal to each of them to control them.

Next, a control method for controlling the intake air volume and the EGR volume by the control device for the internal combustion engine 10 of the present embodiment will be explained.

The ECU 25 determines (calculates) the target intake air volume based on values representing the operational state of the engine such as the accelerator opening degree detected by the accelerator opening degree sensor 27 and the engine rotation speed detected by the engine rotation speed sensor 28, and also determines (calculates) the actual intake air volume based on the detected value of the intake air volume sensor 20.

The target intake air volume is inputted into the ECU 25 beforehand in a form of map or equation. The target intake air volume is set at such a value that smoke does not occur in each operational state (i.e. each fuel injection volume, each accelerator opening degree and each engine rotation speed), and that an appropriate amount of EGR is performed to decrease NOx emission.

The ECU 25 controls opening and closing of the intake throttle valve 19 and the EGR valve 24 so as to conform the actual intake air volume to the target intake air volume, based on the difference between the actual intake air volume and the target intake air volume which is determined from the map or the equation, when the operational state of the internal combustion engine 10 is the normal operational state which excludes the predetermined operational state described after. That is, a feedback control of the actual intake air volume is carried out. As described above, the target intake air volume is predetermined with taking the EGR volume into account. In consequence the EGR volume is adjusted to the amount which is suitable for each operational state.

In the meantime, there is a possibility that the intake noise occurs if the intake throttle valve 19 is opened too much when the internal combustion engine 10 is in the idling operational state or in the decelerating operational state. Therefore, if the operational state of the internal combustion engine 10 is a predetermined operational state (i.e. the idling operational state and the decelerating operational state), the ECU 25 controls the opening degree of the intake throttle valve 19 at such a predetermined constant opening degree that the intake noise does not occur (i.e. the ECU 25 fixes the opening degree of the intake throttle valve to the predetermined opening degree), and controls the opening degree of the EGR valve 24 based on the above-mentioned difference.

Thus, in the present embodiment, the ECU 25 functions as the first control means and the second control means of accompanying claims.

Figure 2:
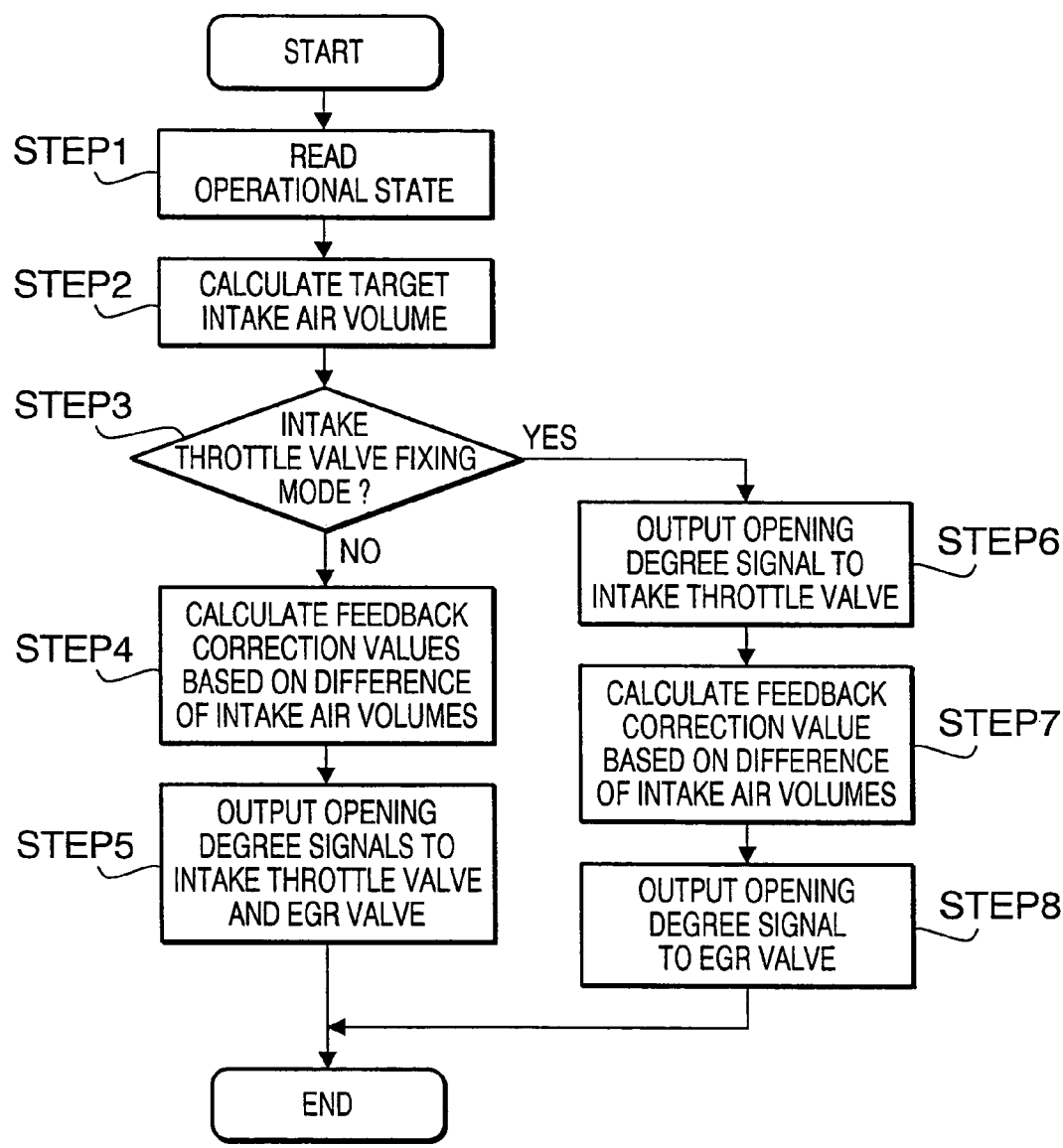
FIG. 2 is a flow chart illustrating a control of the intake air volume performed by ECU.

The control method for controlling the intake air volume performed by the ECU 25 will be now explained with reference to the flow chart of FIG. 2.

Firstly, in step 1, the ECU 25 reads the operational state of the internal combustion engine 10 from the accelerator opening degree sensor 27 and the engine rotation speed sensor 28, etc. Next, in step 2, the ECU 25 calculates (determines) the target intake air volume. In step 3, the ECU 25 judges as to whether the present control mode is a normal control mode or an intake throttle valve fixing mode.

The intake throttle valve fixing mode is a control mode which is conducted when the operational state of the internal combustion engine 10 is a predetermined operational state (for example, the idling operational state or the decelerating operational state). In the intake throttle valve fixing mode, the intake throttle valve 19 is kept at the predetermined constant opening degree as described above, and only the EGR valve 24 is controlled to open or close. On the other hand, the normal control mode is a control mode which is conducted when the operational state of the internal combustion engine 10 is a normal operational state excluding the above predetermined operational state, and is such that both of the intake throttle valve 19 and the EGR valve 24 are controlled to open or close. These control modes are switched by the other control logic, based on the operational state of the internal combustion engine 10.

The control proceeds to step 4 if the ECU 25 determines that the present control mode is the normal control mode (i.e. not the intake throttle valve fixing mode). In this step 4, feedback correction values for the intake throttle valve 19 and the EGR valve 24 are calculated (determined), based on the difference between the target intake air volume and the actual intake air volume detected by the intake air volume sensor 20. Next, in step 5, the ECU 25 outputs opening degree signals to the intake throttle valve 19 and the EGR valve 24, based on the feedback correction values.

On the other hand, in step 3, if the present control mode is determined as the intake throttle valve fixing mode, the control proceeds to step 6, in which the ECU 25 outputs a predetermined opening degree signal to the intake throttle valve 19 to fix its opening degree to the predetermined constant opening degree. As described above, the opening degree of the intake throttle valve 19 is such opening degree that the intake noise does not occur. Next, in step 7, the ECU 25 calculates a feedback correction value for the EGR valve 24 based on the difference between the target intake air volume and the actual intake air volume. In step 8, the ECU 25 outputs the opening degree signal to the EGR valve 24 based on the feedback correction value.

Figure 3:
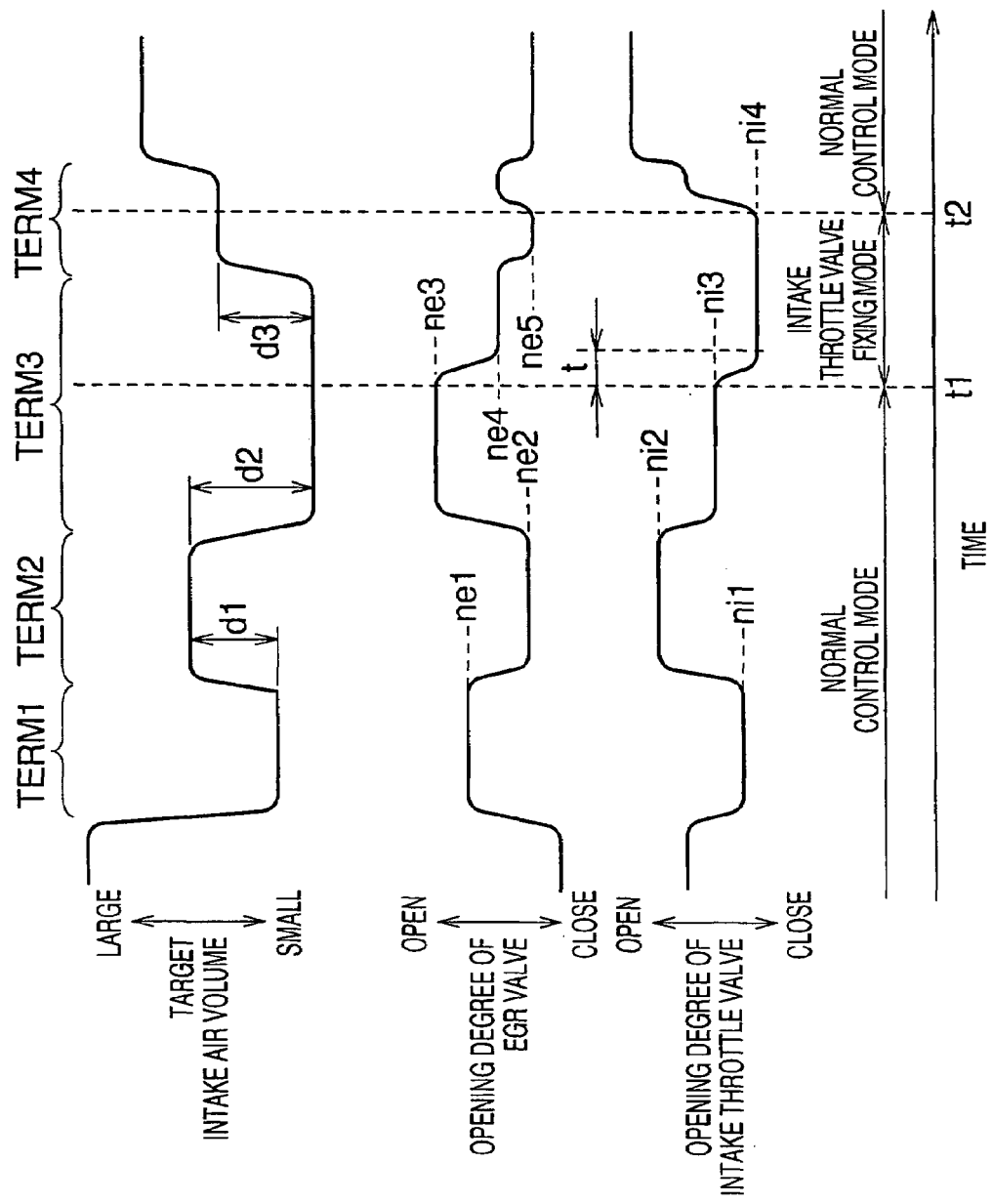
FIG. 3 is a graph showing transitions of the target intake air volume, an opening degree of an EGR valve, and an opening degree of an intake throttle valve.

FIG. 3 shows an example of transitions of the target intake air volume, the opening degree of the EGR valve 24, and the opening degree of the intake throttle valve 19. The control mode is switched from the normal control mode to the intake throttle valve fixing mode at a time t1, and the control mode is switched from the intake throttle valve fixing mode to the normal control mode at a time t2.

Firstly, in a term 1, the opening degrees of the EGR valve 24 and the intake throttle valve 19 are respectively controlled at ne1 and ni1, and the actual intake air volume is conformed to the target intake air volume. The target intake air volume in a subsequent term 2 is increased by d1. Therefore, in order to increase the actual intake air volume by d1, the ECU 25 controls the opening degree of the EGR valve 24 to ne2 (in a closing direction) and the opening degree of the intake throttle valve to ni2 (in an opening direction). By this control, the actual intake air volume increases up to the target intake air volume in the term 2.

In a subsequent term 3, the target intake air volume is decreased by d2. Therefore, the ECU 25 controls the opening degree of the EGR valve 24 to ne3 in the opening direction and the opening degree of the intake throttle valve 19 to ni3 in the closing direction. At the time t1 in the middle of the term 3, the ECU 25 switches the control mode from the normal fixing mode to the intake throttle valve fixing mode. Then, the ECU 25 controls the opening degree of the intake throttle valve 19 to the predetermined constant opening degree (ni4 in this embodiment) for the fixing control mode. On the other hand, the ECU 25 controls the opening degree of the EGR valve 24 to ne4 in the closing direction in order to compensate for the change of the intake air volume caused by changing the opening degree of the intake throttle valve 19.

In a subsequent term 4, the target intake air volume is increased by d3. Therefore, the ECU 25 controls the opening degree of the EGR valve 24 to ne5 in the closing direction. Since the control mode is the intake throttle valve fixing mode, the ECU 25 keeps the opening degree of the intake throttle valve 19 at ni4. At the time t2 in the middle of term 4, the ECU 25 switches the control mode from the intake throttle valve fixing mode to the normal control mode. Then, the ECU 25 stops fixing control of the intake throttle valve 19. In the subsequent process, the EGR valve 24 and the intake throttle valve 19 are both controlled in the same manner as the terms 1 and 2.

In addition, there is a time lag t from the time t1 until the opening degree of the intake throttle valve 19 reaches ni4. This time lag t is an actuation delay time which is taken from the time that the ECU 25 outputs a control signal to the time that the opening degree of the intake valve 19 reaches ni4.

Thus, in the present embodiment, appropriate control can be conducted, because one control object (the intake air volume) is controlled by both the intake throttle valve 19 and the EGR valve 24. Moreover, the target intake air volume is determined with taking the EGR volume into account. As a result the EGR volume is also appropriately controlled.

Furthermore, the intake noise can be decreased, since the opening degree of the intake throttle valve 19 is kept at reduced constant opening degree while the EGR valve 24 is controlled to open or close when the operational state of the internal combustion engine is the idling operational state, and when the vehicle is decelerated.

As described above, according to the control device and method for the internal combustion engine of the present embodiment, the appropriate controls of the intake air volume and the EGR volume can be performed.

What is claimed is:

1. A control device for a diesel engine comprising an EGR passage for connecting an intake passage and an exhaust passage with each other, an EGR valve provided in the EGR passage, and an intake throttle valve provided in the intake passage at an upstream side of a connection part with the EGR passage, comprising:

operational state detection means for detecting an operational state of the diesel engine;

first control means for controlling opening and closing of the intake throttle valve and the EGR valve to adjust an intake air volume if the operational state detection means detects a normal operational state; and second control means for controlling the opening degree of the intake throttle valve at a predetermined constant opening degree and for controlling opening and closing of the EGR valve to adjust the intake air volume, if the operational state detection means detects a predetermined operational state.

2. The control device according to claim 1, further comprising:

actual intake air volume detection means for detecting an actual intake air volume at an upstream side of the intake throttle valve; and target intake air volume calculation means for calculating a target intake air volume based on the operational state detected by the operational state detection means; wherein the first control means controls the opening degrees of the intake throttle valve and the EGR valve, based on a difference between the target intake air volume and the actual intake air volume; and the second control means controls the opening degree of the intake throttle valve at a predetermined constant opening degree and controls the opening degree of the EGR valve based on the difference between the target intake volume and the actual intake air volume.

3. The control device according to claim 1, wherein the predetermined operational state comprises an idling operational state and/or a decelerating operational state.

4. The control device according to claim 1, wherein the operational state detection means comprises an accelerator opening degree sensor for detecting an accelerator opening degree and/or an engine rotation speed sensor for detecting an engine rotation speed.

5. The control device according to claim 1, wherein the predetermined constant opening degree is such an opening degree that an intake noise does not occur.

6. A control method for a diesel engine comprising an EGR passage for connecting an intake passage and an exhaust passage with each other, an EGR valve provided in the EGR passage, and an intake throttle valve provided in the intake passage at an upstream side of a connection part with the EGR passage, comprising steps of:

detecting an operational state of the diesel engine;

performing a first control for controlling opening and closing of the intake throttle valve and the EGR valve to adjust an intake air volume, if the detected operational state is a normal operational state; and performing a second control for controlling an opening degree of the intake throttle valve at a predetermined constant opening degree, and for controlling opening and closing of the EGR valve to adjust the intake air volume, if the detected operational state is a predetermined operational state.

7. The control method according to claim 6, further comprising steps of: detecting an actual intake air volume at an upstream side of the intake throttle valve; and calculating a target intake air volume based on the detected operational state; wherein the first control comprises controlling the opening degrees of the intake throttle valve and the EGR valve, based on the difference between the target intake air volume and the actual intake air volume; and the second control comprises controlling the opening degree of the intake throttle valve at the predetermined constant opening degree and controlling the opening degree of the EGR valve based on the difference between the target intake air volume and the actual intake air volume.

8. The control method according to claim 6, wherein the predetermined operational state comprises an idling operational state and/or a decelerating operational state.

9. The control method according to claim 6, wherein the detecting of the operational state comprises a step of detecting an accelerator opening degree and/or a step of detecting an engine rotation speed.

10. The control method according to claim 6, wherein the predetermined constant opening degree is such an opening degree that an intake noise does not occur.

* * * * *